Patented Jan. 1, 1924.

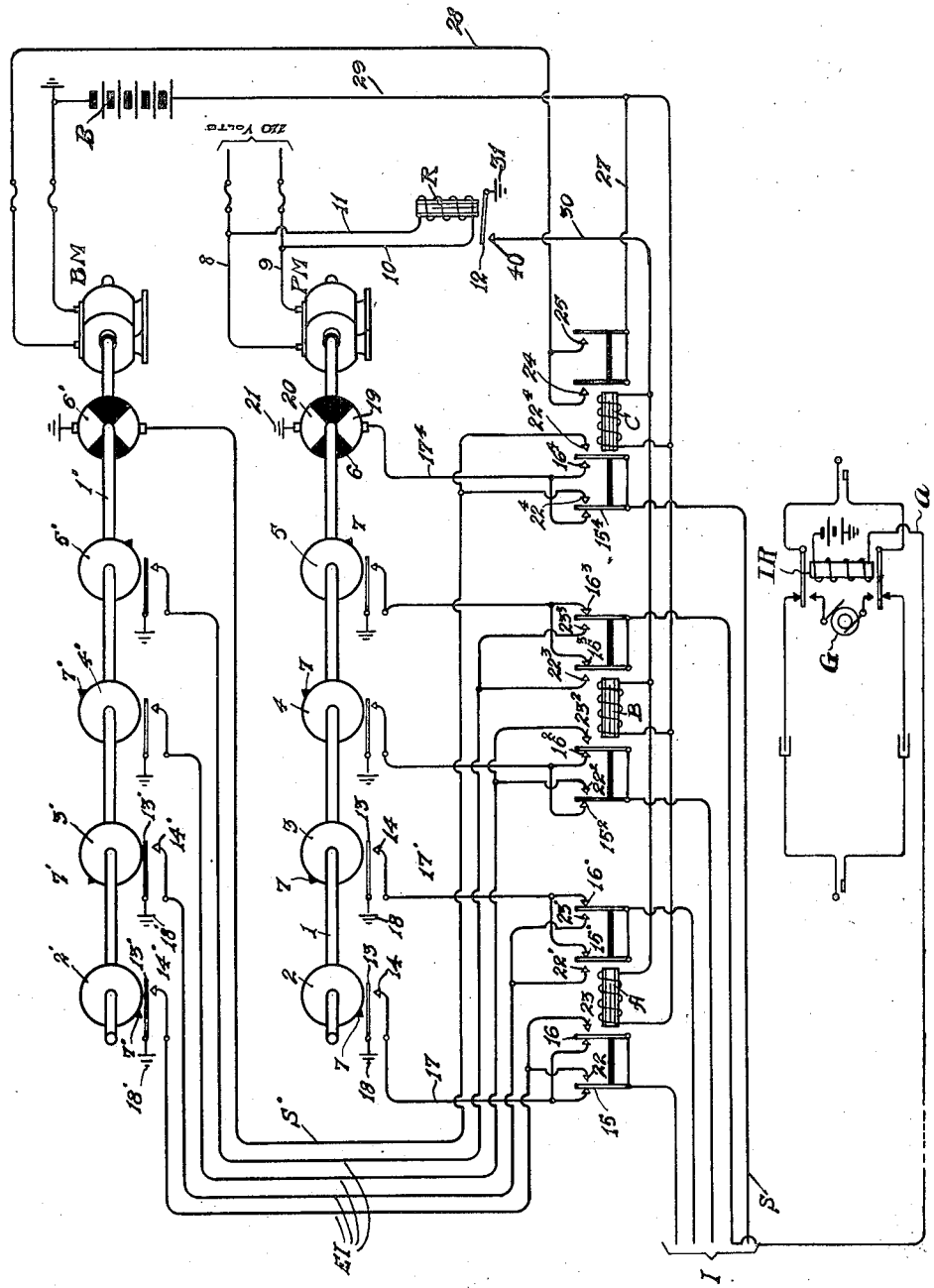

1,479,555

UNITED STATES PATENT OFFICE.

EARL F. POTTER, OF GLENCOE, ILLINOIS, ASSIGNOR TO KELLOGG SWITCHBOARD AND SUPPLY COMPANY, OF CHICAGO, ILLINOIS, A CORPORATION OF ILLINOIS.

TELEPHONE SYSTEM.

Application filed January 26, 1921. Serial No. 439,901.

*To all whom it may concern:*

Be it known that I, EARL F. POTTER, a citizen of the United States of America, residing at Glencoe, county of Cook, and State of Illinois, have invented certain new and useful Improvements in Telephone Systems, of which the following is a specification.

My invention relates to ringing interrupters such as are commonly used in connection with ringing and signaling means in telephone exchange systems. In telephone systems of the class in which so-called automatic or machine ringing is employed, duplicate ringing interrupters are employed, one which may be termed the primary ringing interrupter, which is motor-driven and the current for operating the motor is usually supplied from a 110-volt current received from an outside source such as the town or city electric power plant. The other ringing interrupter, commonly called the emergency ringing interrupter, is also motor-driven and the current for operating the motor is supplied by current received from an exchange storage battery. In many instances the source of current operating the motor for rotating the interrupter mechanism of the primary interrupter is shut off, which makes it necessary to employ the emergency ringing interrupter, and in order to connect the storage battery with the motor for rotating the emergency interrupter mechanism, the operator presses a button which is located on the switchboard and under her control, or a switch is operated which is located on the powerboard.

This means for connecting and disconnecting the sources of current to the motors is objectionable because of loss of time, due to its being done manually, and sometimes the storage battery is employed for a longer period than is necessary. To overcome these objectionable features, I provide a relay which I bridge across the power leads carrying the 110-volt current from the outside source to the primary motor. As long as current is flowing through the power leads, this relay will be energized, but should the current be shut off it will de-energize, closing a circuit, whereby means are operated for connecting the motor of the emergency interrupter to the exchange storage battery. Means are also automatically operated which switch the interrupter leads which extend to the different positions of an exchange switchboard, from the primary interrupted to the emergency interrupter. Upon the restoration of current to the primary interrupter the relay bridged across the power leads will again energize to disconnect the emergency interrupter and motor and again connect the interrupter leads to the primary interrupter.

In the accompanying drawing I show two electrically driven motors, one of which is connected to and operated by a 110-volt current, and this motor I will term "power motor"; the other motor is connected to and adapted to operate by a storage battery, and this motor I will term "battery motor". Across the conductors 8 and 9 supplying current to the power motor PM is bridged a relay R which is energized as long as a current passes to the power motor PM. Across the conductors 29 and 30, I show relays A, B and C bridged and in multiple with each other, said relays being normally unenergized due to the energization of the relay R, which by the attraction of its armature keeps the circuit containing the relays A, B and C open.

I also show four interrupter leads I which in actual practice are distributed among the various operators' positions at the telephone exchange. All or any number of the leads I may appear in the same operator's position, the number of leads I to appear in any one position, however, will depend upon the number of cord circuits provided at the operator's position. For the sake of explanation let it be assumed that there are fifteen cord circuits appearing in a single operator's position, then, in actual practice these cord circuits will be divided into groups, in this case assume in groups of five cords each. Three of the interrupter leads I will now be extended to this operator's position and then distributed so that a lead I will be multiply connected to the interrupter ringing relays of a group of the cord circuits, there being a relay for each cord circuit, and no two interrupter leads I extending to the same group of cord circuits. The primary interrupter mechanism and the emergency interrupter mechanism are each constructed and arranged so that a circuit will not be closed through more than one one of the leads I at the same time whereby sufficient battery will always flow through the lead I through which a circuit is closed to insure positive operation of all the interrupter relays multiply connected to the said lead I, in case all of the cord circuits associated with these relays are in their operative position for applying ringing current to the called telephone line.

The interrupter leads I may be suitably distributed in any of the well known ways so that they will appear in certain operators' positions and as the manner of distributing the said leads I, does not comprise any part of my invention, a description of the same is deemed unnecessary.

In the drawing I show a skeleton cord circuit showing the ringing interrupter relay IR having its winding connected to one of the interrupter leads I. Of course, it is to be understood that the conductor $a$ will in actual practice include several contacts, including a contact of a relay which operates to extend the conductor $a$ to a lead I only when the ringing key plunger of the ringing apparatus associated with the cord circuits is operated, as is well known to those familiar with the art. Another lead S is also shown which terminates in the switchboard for signaling purposes, as will be described in the ensuing specification.

To the rotatable shaft 1 of the power motor PM are secured disks 2, 3, 4 and 5, each of which is provided with a cam surface 7, the purpose of which is to close contacts completing interrupter circuits. Another disk 6, constructed of two metal segments and two insulating segments, is also secured to the shaft 1 of the power motor PM.

To the shaft 1' of the battery motor BM are secured disks 2', 3', 4', 5' and 6', which are the same design and arranged in the same manner as the disks 2, 3, 4, 5 and 6 are arranged on the shaft 1 of the power motor PM.

To more fully explain my invention, assume that a current be permitted to pass through the conductors 8 and 9 and through the primary motor PM, this will operate the motor PM, which will rotate its shaft 1 bearing the disks 2, 3, 4, 5 and 6 at a determined speed. The relay R being in multiple with the motor PM will be energized by a current flowing through conductors 10 and 11, and will attract its armature 12, opening the circuit containing the relays A, B and C.

To give an illustration of the operation of the disks carried by the shaft 1 of the motor PM, I describe that of disk 2, the others operating in the same manner, but each closing circuits leading to a different position in the telephone exchange switchboard.

A set of contacts 13 and 14, which are normally open, are operatively associated with the disk 2 so that during a part of a complete cycle of the disk 2, the cam surface 7 will engage the spring contact 13, pressing it into engagement with contact 14, to energize the ringing interrupter relay of a cord circuit, in the usual manner by current from battery through such relay over the corresponding interrupter conductor I, normally closed contacts 15 and 16 of relay A, conductor 17, contact 14, spring contact 13 to ground at 18. This circuit will be closed as long as the cam surface 7 is riding over and pressing the spring contact 13 into engagement with contact 14 and the ringing interrupter relay of the cord circuit is thus energized each time the contacts 13 and 14 are closed to intermittently connect ringing current to the called line.

The disks 2, 3, 4 and 5 are arranged on the shaft in such a way that no two of the disks have their cam surface 7 in engagement with their corresponding spring contact 13 at the same time.

The disk 6 rotating with the shaft 1 is connected to the cord circuit in the telephone exchange for tone purposes by means of the tone conductor S in the well known manner. The disk 6 closes a circuit every half revolution which may be traced from the battery associated with the cord circuits, over conductor S, normally closed contacts $15^4$ and $16^4$ of relay C, conductor $17^4$, metal segments 19 and 20 to ground at 21.

To further illustrate my invention, suppose the current operating the power motor PM is shut off; this will cause the deenergization of the relay R, which will release its armature 12 and close a circuit at contact 40, which may be traced from the ungrounded side of battery B, conductor 29, windings of relays A, B and C, in multiple, conductor 30, back contact 40 of relay R, ground 31 to the grounded side of battery. Relays A, B and C will be energized over this circuit and will attract their armatures, which will open their normally closed contacts 15 and 16, 15' and 16', $15^2$ and $16^2$, $15^3$ and $16^3$, $15^4$ and $16^4$, and close their alternate contacts 22 and 23, 22' and 23', $22^2$ and $23^2$, $22^4$ and $24^4$, and also alternate contacts 24 and 25 of relay C, thus switching the interrupter leads I from the primary interrupter to the emergency interrupter.

The closure of alternate contacts 24 and 25 of relay C closes a circuit for supplying current to the battery motor BM traced from battery, conductors 29 and 27, alternate contacts 24 and 25 of relay C, conductor 28, motor BM, to the other side of battery B. The motor BM will operate, rotating the shaft I' to which are rotatably secured disks 2', 3', 4', 5' and 6', which are of the same type and operate in the same manner as the disks 2, 3, 4, 5 and 6 do in the primary interrupter as hereinbefore described. The ringing interrupter relay of the cord circuits will now be energized and de-energized over the interrupter conductors I, alternate contacts 22 and 23 of relay A, corresponding conductor EI, contacts 13' and 14' to ground at 18' when the contacts 13' and 14' are closed and opened due to the cam surface or ear 7' on the disk 2' riding over the spring 13' as described in operation of disk 2 in the primary interrupter. The emergency interrupter will continue to operate and replace the primary interrupter as long as the relay R is de-energized and the relays A, B and C are energized, but should current again be supplied to the power motor PM, the relay R will energize and attract its armature 12, thus opening a circuit at contact 40, which will cause the deenergization of relays A, B and C. Relays A, B and C will release their armatures and open their alternate contacts 22 and 23, etc., and close their normally closed contacts 15 and 16, etc., thus switching conductors I and S from conductors EI and S' back to conductors 17 of the primary interrupter. The de-energization of relay C opens its alternate contacts 24 and 25, thus opening the circuit supplying current from the storage battery B to the battery motor BM.

While I have illustrated my invention in connection with an interrupter, I do not wish thereby to be limited to this particular application of my invention, as it may be used for a number of purposes.

Having described my invention what I claim as new and desire to secure by Letters Patent is:

1. A circuit arrangement of the character described including a circuit leading to a primary motor, a primary interrupter having conductor leads normally associated therewith, an emergency interrupter, a relay bridged across the conductors of said primary motor circuit, and a normally open battery circuit controlled by said relay and having a number of relays bridged across the conductors of said battery circuit for switching said conductor leads from said primary interrupter to said emergency interrupter.

2. A circuit arrangement of the character described including a primary motor circuit having a relay bridged across its conductors and normally energized, a normally open battery circuit with a number of relays bridged across its conductors, the operation of said relays controlled by said relay bridged across the primary motor circuit conductors, and an emergency motor in a normally open battery circuit operable when the said number of relays are energized.

3. A circuit arrangement of the character described including a primary motor circuit having a normally energized relay bridged across its conductor leads, primary interrupter mechanism having conductors extending therefrom, interrupter conductor leads extending from operators' positions in a telephone switchboard and operatively associated with the cord circuits at said operators' position, a normally open battery circuit, a number of relays bridged across the conductors of said battery circuit, and having normally closed contacts which make connection between said interrupter conductor leads, and said conductors extending from said primary interrupter mechanism when said first relay is energized.

4. A circuit arrangement of the character described including a primary motor circuit having a normally energized relay bridged across its conductors, a primary interrupter mechanism for said primary motor, conductor leads extending from said primary motor, other conductor leads extending from operators' positions in a telephone exchange and operatively associated with cord circuits at said operators' positions, a normally open battery circuit controlled by said relay and having a number of relays bridged across its conductors, an emergency interrupter mechanism having conductors extending thereto, said relays operable when said first relay is energized to connect said other conductor leads to the conductor leads extending from said primary motor, and operable when said first relay is de-energized to connect said other conductor leads to said conductors extending to said emergency interrupter mechanism.

5. A circuit arrangement of the character described including a primary motor circuit having a normally energized relay bridged across its leads, conductor leads extending from a telephone switchboard, a primary interrupter mechanism having conductor leads extending thereto, an emergency interrupter mechanism having conductors extending thereto, a normally open battery circuit having a number of normally de-energized relays bridged across its conductors which have normally closed contacts connecting said conductor leads extending from a telephone switchboard with said conductors leading to said primary interrupter mechanism, said normally de-energized relays operable to open their normally closed contacts and close their alternate contacts, thereby switching the said first conductor leads from said primary interrupter conductors to said conductors extending to an emergency interrupter mechanism upon the de-energization of said normally energized relay.

6. In a telephone system, a relay adapted to apply ringing current to a called station circuit, a pair of motor-driven interrupter devices adapted to be operatively connected with said ringing relay at different times and switching means operative to automatically disconnect one of said interrupter devices when it becomes disabled, and to connect the other of said devices to said relay.

7. A telephone system including a relay to connect signaling current to a station, interrupter means to intermittently actuate said relay, a second interrupter means and a switch automatically operated on disablement of said first means to connect said second means in its place and to automatically disconnect said last means and reconnect said first means on termination of its disablement.

8. In a telephone system, in combination with a plurality of relays for supplying signaling current to connected stations, of common interrupter means organized to actuate said relays in succession, substitute interrupter means, and switching apparatus automatically effective to connect said substitute interrupter means when said first means is disabled.

9. In a telephone system, in combination with a plurality of relays for supplying signaling current to connected stations, of interrupter mechanism common to said relays to energize and de-energize them and switch means automatically effected to alter the connections of said relays when said mechanism is disabled and restore them when said mechanism again becomes operative.

10. In a telephone system, a plurality of electromagnets and common interrupter means including an electric motor, a group of relays in multiple circuit with each other and normally associated with said interrupter means for connecting said interrupter means in circuit with said electromagnets, a relay controlling the association of said group of relays and said interrupter means, and means automatically effective to energize and de-energize said relay to cause the operation of said group of relays.

Signed by me at Chicago, in the county of Cook and State of Illinois, this 24th day of January, 1921.

EARL F. POTTER.